US012649175B2

(12) United States Patent
Ligertwood et al.

(10) Patent No.: US 12,649,175 B2
(45) Date of Patent: Jun. 9, 2026

(54) CLEANING SYSTEM FOR A FLUID TESTING SYSTEM

(71) Applicant: Schlumberger Technology Corporation, Sugar Land, TX (US)

(72) Inventors: Brian Ligertwood, Houston, TX (US); Bojan Mitric, Houston, TX (US); Timothy Lesko, Rosenberg, TX (US); Diego Basilio Araujo, Houston, TX (US); Kenneth Slater, Sealy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 215 days.

(21) Appl. No.: 18/419,648

(22) Filed: Jan. 23, 2024

(65) Prior Publication Data

US 2025/0235907 A1 Jul. 24, 2025

(51) Int. Cl.

| | |
|---|---|
| ***E21B 49/08*** | (2006.01) |
| ***B08B 5/02*** | (2006.01) |
| ***B08B 7/02*** | (2006.01) |
| ***B08B 9/087*** | (2006.01) |
| ***B08B 9/093*** | (2006.01) |

(52) U.S. Cl.
CPC ................ *B08B 9/093* (2013.01); *B08B 5/02* (2013.01); *B08B 7/02* (2013.01); *B08B 9/087* (2013.01); *E21B 49/088* (2013.01)

(58) Field of Classification Search
None
See application file for complete search history.

(56) References Cited

U.S. PATENT DOCUMENTS

| | | | | |
|---|---|---|---|---|
| 3,777,551 | A | 12/1973 | Weiss | |
| 3,839,914 | A | 10/1974 | Modisette | |
| 4,241,744 | A * | 12/1980 | Jordan, Sr. | B08B 9/08 4/597 |
| 7,823,656 | B1 | 11/2010 | Williams | |
| 8,065,907 | B2 | 11/2011 | Colquhoun | |
| 8,347,693 | B2 | 1/2013 | Pindiprolu | |
| 8,392,121 | B2 | 3/2013 | Zamora | |
| 8,522,896 | B2 | 9/2013 | Rowden | |
| 8,881,577 | B1 | 11/2014 | Agar | |
| 8,994,389 | B2 | 3/2015 | Growcock | |
| 9,134,291 | B2 | 9/2015 | Jamison et al. | |
| 9,244,026 | B2 | 1/2016 | Stock | |
| 9,255,473 | B2 | 2/2016 | Burress | |
| 9,274,038 | B2 | 3/2016 | Murphy | |
| 9,398,640 | B2 | 7/2016 | Bhaidasna | |
| 9,513,203 | B2 | 12/2016 | Kulkarni | |
| 9,513,272 | B2 | 12/2016 | Larson | |

(Continued)

FOREIGN PATENT DOCUMENTS

EP 0211112 A1 2/1987

OTHER PUBLICATIONS

CN 117368045 A machine translation, System and Method for Monitoring Performance of Drilling Fluid, Mei (Year: 2024).*

*Primary Examiner* — Cristi J Tate-Sims
(74) *Attorney, Agent, or Firm* — Jeffrey D. Frantz

(57) ABSTRACT

A fluid testing system includes a fluid container with an inner surface that defines a chamber. The fluid testing system also includes a spray bar that extends circumferentially about at least a portion of the chamber, wherein the spray bar includes multiple cleaning fluid outlets to spray a cleaning fluid onto the inner surface that defines the chamber.

20 Claims, 8 Drawing Sheets

(56) References Cited

U.S. PATENT DOCUMENTS

| | | | | |
|---|---|---|---|---|
| 9,567,836 | B2 | 2/2017 | Jamison | |
| 9,568,408 | B2 | 2/2017 | Jamison | |
| 9,638,618 | B2 | 5/2017 | Villard | |
| 9,777,542 | B2 * | 10/2017 | Stock | G01N 11/10 |
| 10,113,408 | B2 | 10/2018 | Pobedinski | |
| 10,151,192 | B2 | 12/2018 | Burress | |
| 10,370,952 | B2 | 8/2019 | Jamison | |
| 10,385,636 | B2 | 8/2019 | Midlang | |
| 10,465,511 | B2 | 11/2019 | Watson | |
| 10,527,468 | B2 | 1/2020 | Dykstra | |
| 10,539,002 | B2 | 1/2020 | Ye | |
| 10,564,083 | B2 | 2/2020 | Spoerker | |
| 10,577,876 | B2 | 3/2020 | Dykstra | |
| 10,598,581 | B2 | 3/2020 | Tozzi | |
| 10,612,325 | B2 | 4/2020 | Ye | |
| 10,738,551 | B1 | 8/2020 | Smith | |
| 10,745,986 | B2 | 8/2020 | Midlang | |
| 10,901,377 | B2 | 1/2021 | Dykstra | |
| 2004/0089329 | A1 * | 5/2004 | Bijster | B05B 3/02<br>134/167 R |
| 2009/0236144 | A1 * | 9/2009 | Todd | E21B 33/0355<br>175/5 |
| 2010/0298174 | A1 * | 11/2010 | Tehrani | E21B 21/066<br>507/119 |
| 2011/0185795 | A1 | 8/2011 | Colquhoun | |
| 2017/0198536 | A1 | 7/2017 | Song | |
| 2018/0334905 | A1 | 11/2018 | Dahl | |
| 2019/0093468 | A1 | 3/2019 | Aguirre | |
| 2020/0182852 | A1 * | 6/2020 | Stewart | G01N 9/36 |
| 2021/0088499 | A1 | 3/2021 | Stewart | |
| 2022/0291107 | A1 | 9/2022 | Calleri | |
| 2022/0317001 | A1 | 10/2022 | Jamison | |

* cited by examiner

CLEANING SYSTEM FOR A FLUID TESTING SYSTEM

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Natural resources, such as oil and gas, are used as fuel to power vehicles, heat homes, and generate electricity, in addition to various other uses. Once a desired resource is discovered below a surface of the earth, drilling systems are often employed to carry out drilling operations to access the desired resource. During the drilling operations, drilling fluid is pumped through a drill string into a wellbore to facilitate drilling a well. The drilling fluid then flows through an annular space defined between the drill string and the wellbore to return to equipment located at a surface. It is presently recognized that it is desirable to monitor properties of the drilling fluid.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In certain embodiments, a fluid testing system includes a fluid container with an inner surface that defines a chamber. The fluid testing system also includes a spray bar that extends circumferentially about at least a portion of the chamber, wherein the spray bar includes multiple cleaning fluid outlets to spray a cleaning fluid onto the inner surface that defines the chamber.

In certain embodiments, a fluid testing system includes a fluid container and a passageway formed in a wall of the fluid container to maintain a defined level for a sample fluid in a chamber of the fluid container. The fluid testing system also includes a spray bar with multiple cleaning fluid outlets to spray a cleaning fluid into the chamber of the fluid container.

In certain embodiments, a fluid testing system includes a fluid container and a rheometer configured to detect rheology parameters of a sample of drilling fluid within a chamber of the fluid container during a testing process. The fluid testing system also includes a spray bar with multiple cleaning fluid outlets to spray a cleaning fluid into the chamber of the fluid container during a cleaning process.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION OF SPECIFIC EMBODIMENTS

Figure 1:
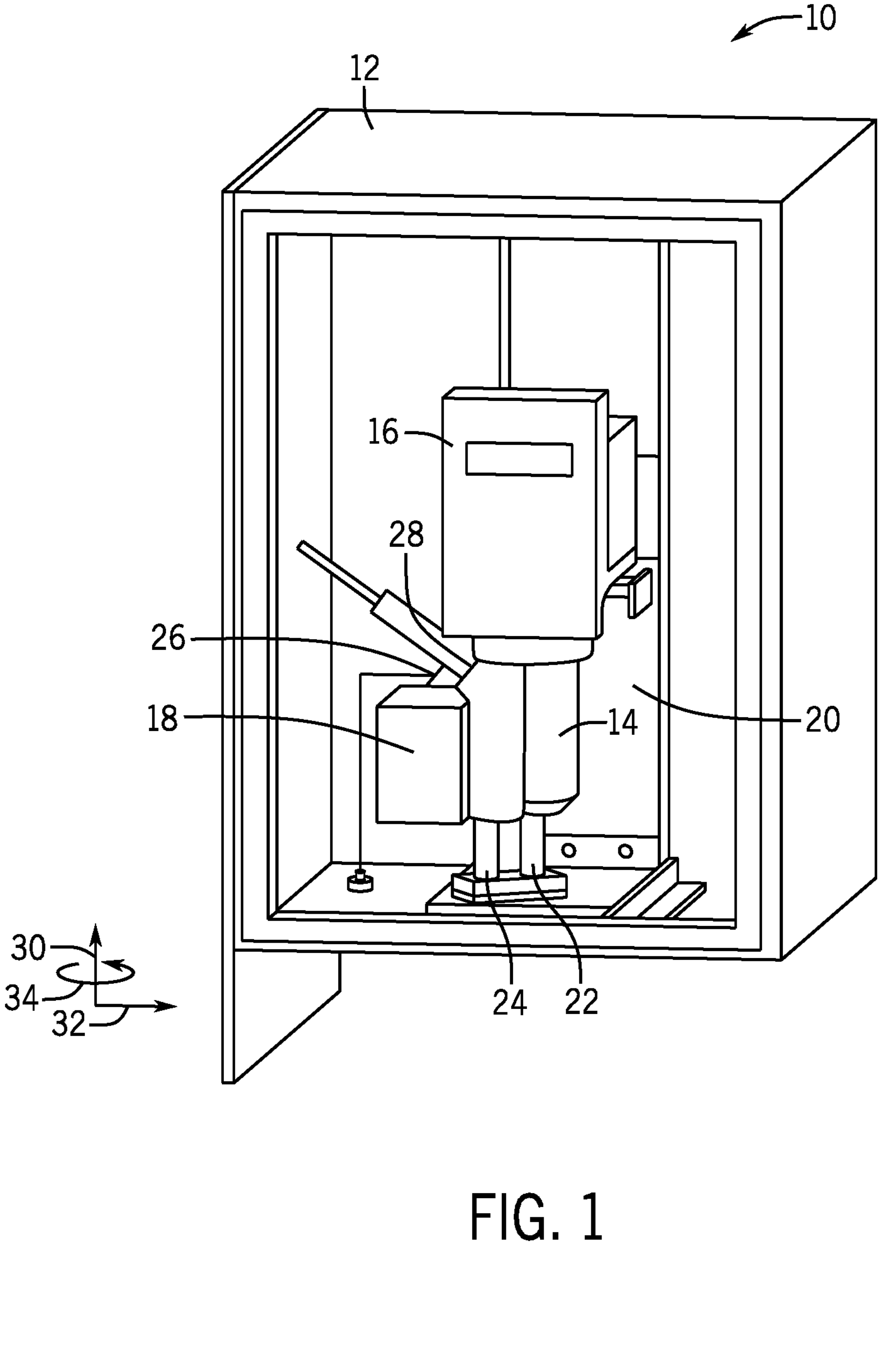
FIG. 1 is a perspective front view of a portion of a fluid testing system, wherein a wall of an enclosure is removed to facilitate visualization of components within the enclosure, in accordance with an embodiment of the present disclosure.

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

During drilling operations, drilling fluid is pumped through a drill string into a wellbore to facilitate drilling a well. The drilling fluid then flows through an annular space defined between the drill string and the wellbore to return to equipment located at a surface. During the drilling operations, a fluid testing system may monitor certain properties of the drilling fluid. For example, during the drilling operations, the fluid testing system may be operated to periodically monitor rheological properties of the drilling fluid.

In certain embodiments, the fluid testing system may be located onsite (e.g., on a skid placed at the surface above the wellbore). A fluid container and components, such as a viscometer, may be positioned within an enclosure. A sample fluid (e.g., a sample of the drilling fluid) is periodically introduced into the fluid container, characterized via analysis with the viscometer while in the fluid container, and then drained from the fluid container.

Further, the fluid container is cleaned at various times. For example, the fluid container may be cleaned periodically (e.g., every 30, 60, or 90 minutes), after each testing cycle (e.g., after the sample fluid is drained from the fluid container), or at any other suitable time. Accordingly, the fluid testing system may include or be operated with a cleaning system that effectively and efficiently cleans the fluid container. In certain embodiments, the cleaning system may include a spray bar with one or more cleaning fluid outlets to distribute a cleaning fluid into the fluid container. The spray bar may be fixed within the fluid container, adjustable within the fluid container, or integrated into a side wall of the fluid container. Additionally or alternatively, the cleaning system may include one or more wipers on a rotor of the viscometer, one or more bladders within the fluid container, and/or one or more vibration devices. Additionally or alternatively, the fluid container may include a geometry that limits or blocks formation or build up of residue along the side wall of the fluid container. For example, the fluid container may include an annular ledge formed in the side wall of the fluid container.

Advantageously, the cleaning system described herein may facilitate cleaning the fluid container, such as by removing or washing away residue from the side wall of the fluid container. In certain cases, the residue may include remnants or portions of the sample fluid that at least temporarily adhere to or remain along the side wall of the fluid container, even after the sample fluid is drained from the fluid container. The residue may form along or proximate to a fill line of the sample fluid within the fluid container, and thus, the cleaning system may be positioned at and/or may be operated to clean and to remove the residue from this region of the fluid container.

The fluid testing system and the cleaning system described herein may be part of an automated system that is configured to circulate and test the sample fluid, as well as clean the fluid container, via automated processes (e.g., move between at least some steps without human intervention). Additionally, the fluid testing system may perform other types of tests on the sample fluid, such as weight, density, water-oil content, emulsion electrical stability, fluid conductivity, particle size, chemical properties (e.g., concentration of certain ions, titrations, and/or pH), and so forth.

With the foregoing in mind, FIG. 1 is a perspective front view of an embodiment of a portion of a fluid testing system 10, wherein a wall of an enclosure 12 is removed to facilitate visualization of components within the enclosure 12. As shown, the components may include a fluid container 14 and related parts. However, while in use, the enclosure 12 may be configured to form a fully enclosed and sealed interior cavity that houses the fluid container 14 and the related parts. Further, while in use, the enclosure 12 may be purged and pressurized via a flow of compressed air into the enclosure 12 to block ingress of other gases into the enclosure 12.

In certain embodiments, the fluid testing system 10 may be subject to ATEX, IECex, and/or UKCA standards. For example, the fluid testing system may be subject to ATEX, IECex, and/or UKCA standards due to presence of drilling fluid and/or due to being located in an area with a potential presence of explosive gases. Accordingly, by positioning the fluid container 14 and the related parts within the enclosure 12 that is purged and pressurized, as well as constructing the fluid container 14 to be infallible (e.g., continuous, one-piece construction and weldments; devoid of fittings) in portions that contain sample fluid (e.g., sample of the drilling fluid), the fluid testing system 10 enables the sample fluid to circulate through the fluid container 14 in a manner certified by ATEX, IECex, and/or UKCA (e.g., in compliance with ATEX, IECex, and/or UKCA standards). ATEX refers to "Atmospheres Explosibles" and is a set of European Union regulations related to products used in explosive environments, IECex refers to "International Electrotechnical Commission Explosive" and is a set of regulations accepted in several countries and related to products used in explosive environments. UKCA refers to "UK Conformity Assessment" and is a set of regulations that apply to products sold in Great Britain. It should be appreciated that the fluid testing system 10 may be subject to any of a variety of regulations set forth by one or more countries, agencies, or so forth, and features of the fluid testing system 10 may enable the fluid testing system 10 to satisfy or meeting any of a variety of regulations set forth by one or more countries, agencies, or so forth.

As shown in FIG. 1, the fluid container 14 is coupled to a rheometer sensor 16 (e.g., rheometer; rheology sensor; viscometer) and a temperature control system 18. The fluid container 14 is also supported on a frame 20 that is coupled (e.g., via one or more fasteners, such as threaded fasteners) to the enclosure 12. In certain embodiments, an inlet line 22 may provide the sample fluid to the fluid container 14, and an outlet line 24 may enable extraction of the sample fluid from the fluid container 14. The frame 20 enables placement of the inlet line 22 and the outlet line 24 through the frame 20 and the enclosure 12.

In certain embodiments, ports (e.g., closed or sealed via a plug) may couple to a passageway (e.g., cross-drilled passageway) that extends through the fluid container 14 to the outlet line 24. Additionally, an atmospheric reference port 26 may enable removal of any gases above the sample fluid within the fluid container 14, and a level limit switch port 28 may support a level limit sensor (e.g., capacitance sensor) to detect occurrence of a high level of the sample fluid (e.g., above a defined level or target level). The level limit sensor may operate to detect occurrence of a high level of the sample fluid in the fluid container (e.g., above a defined level), but the level limit sensor is used only as a "high-high" switch that indicates improper operation and to shut-down operation to enable maintenance operations.

It should be appreciated that, in certain embodiments, the fluid testing system 10 may be devoid of the outlet line 24, and the inlet line 22 may provide the sample fluid to the fluid container 14 and also enable extraction of the sample fluid from the fluid container 14. Indeed, it should be appreciated that the fluid testing system 10 may include any combination of inlets and/or outlets in any suitable locations to provide the sample fluid to the fluid container 14 and also enable extraction of the sample fluid from the fluid container 14. To facilitate discussion, the fluid testing system 10 and its components (e.g., the fluid container 14) may be described with reference to a vertical axis or direction 30, a lateral or radial axis or direction 32, and/or a circumferential axis or direction 34.

Figure 2:
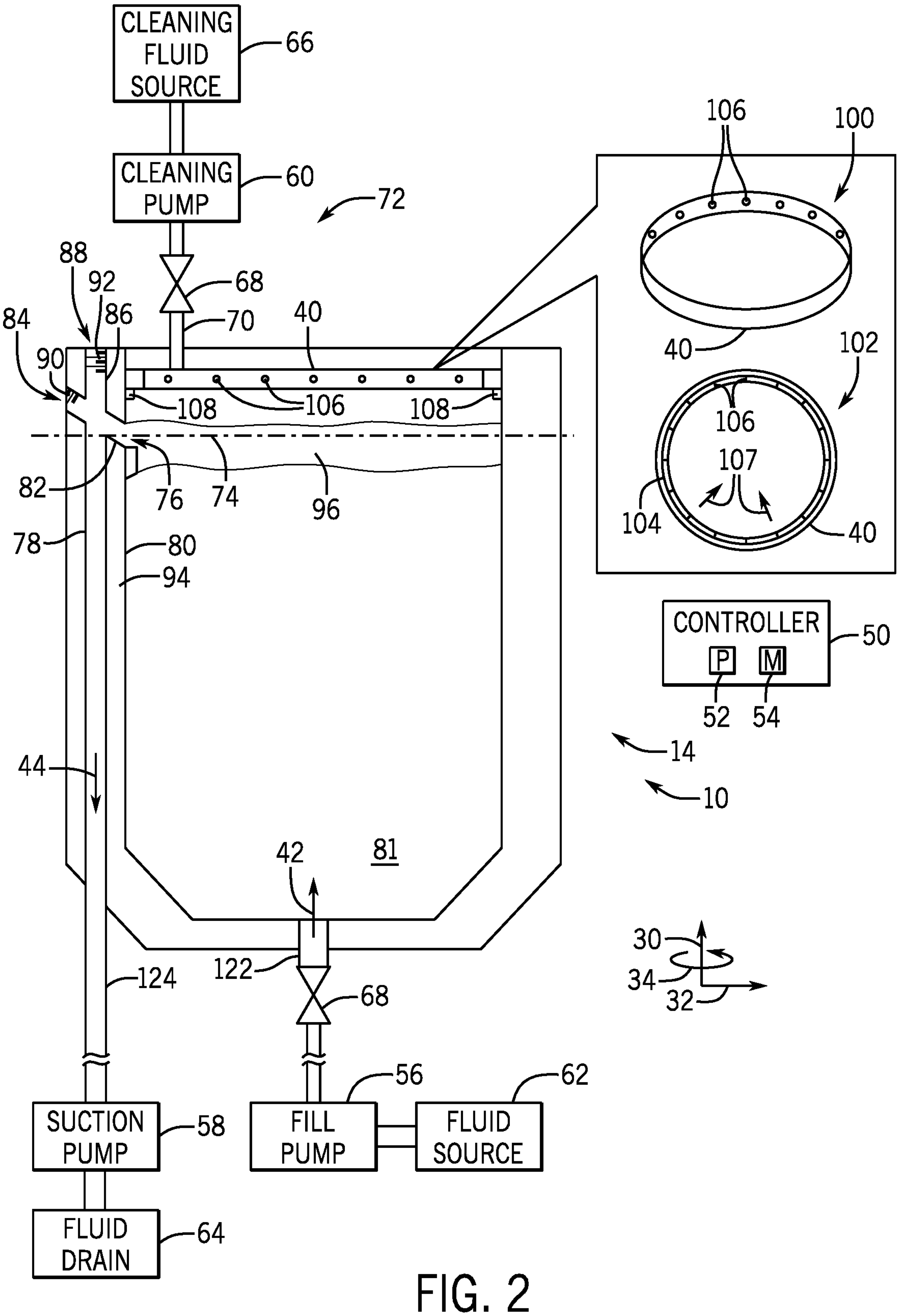
FIG. 2 is a cross-sectional side view of a fluid container that may be utilized as part of the fluid testing system of FIG. 1, wherein the fluid container includes a spray bar, in accordance with an embodiment of the present disclosure.

FIG. 2 is a cross-sectional side view of an embodiment of the fluid container 14, wherein the fluid container 14 includes a spray bar 40. As shown, the inlet line 122 and the outlet line 124 extend from the fluid container 14. Arrows 42, 44 indicate a flow path of the sample fluid into and out of the fluid container 14. In particular, the arrow 42 indicates flow of the sample fluid into the fluid container 14, and the arrow 44 indicates flow of the sample fluid out of the fluid container 14. As shown, the sample fluid enters into the fluid container 14 via the inlet line 122, and the sample fluid exits from the fluid container 14 via the outlet line 124.

In operation and to carry out analysis of the sample fluid, a controller 50 that includes a processor(s) 52 and a memory device(s) 54 may control a fill pump 56, a suction pump 58, and a cleaning pump 60 in a coordinated manner. The fill pump 56 may be fluidly coupled to a fluid source 62 and the inlet line 122, the suction pump 58 may be fluidly coupled to a fluid drain 64 and the outlet line 124, and the cleaning pump 60 may be fluidly coupled to a cleaning fluid source 66. It should be appreciated that the fluid drain 64 may be a recycling system to recycle and to reuse the sample fluid (e.g., in the drilling operations). Further, the controller 50 may control one or more valves 68 (e.g., via actuators), such as to enable or block fluid flow across the one or more valves 68. Together, the spray bar 40, the cleaning pump 60, the cleaning fluid source 66, and related components, such as a cleaning fluid inlet line 70, may form or be part of a cleaning system 72.

To carry out a sequence of tests with the fluid testing system 10, the controller 50 may instruct the rheometer 16 of FIG. 1 to test the sample fluid within the fluid container 14. Then, the controller 50 may instruct the suction pump 58 to operate at a suction pump rate to begin extracting the sample fluid from the fluid container 14. After some period of time, the controller 50 may instruct the fill pump 56 to operate at a fill pump rate to begin pumping the sample fluid into the fluid container 14. In certain embodiments, the suction pump rate is greater than the fill pump rate (e.g., the suction pump rate is 2, 3, 4, 5, 6, 7, 8, or more times the fill pump rate).

To obtain accurate measurements with the rheometer 16 of FIG. 1, the sample fluid within the fluid container 14 should be at a defined level 74 (e.g., target level). In certain embodiments, operation of the fill pump 56 and the suction pump 58 as described herein, along with placement of an opening 76 to a cross-drilled passageway 78, provide a positive level for the sample fluid within the fluid container 14 (e.g., cause the sample fluid to be at the defined level 74 due to placement and position of the opening 76 and operation of the suction pump 58; without sensors to monitor a level of the sample fluid and/or without analyzing signals from sensors to determine that the sample fluid is at the defined level 74 and thereafter controlling the pumps 56, 58 based on the signals to achieve the defined level 74).

In particular, in such cases, the opening 76 is formed in an inner surface 80 (e.g., annular surface that defines a chamber 81) of the fluid container 14 at the defined level 74. Thus, by operating the fill pump 56 at the fill pump rate to provide the sample fluid to the fluid container 14 and operating the suction pump 58 at the suction pump rate to extract the sample fluid through the opening 76 to the cross-drilled passageway 78, the sample fluid will reach and remain at the defined level 74. Then, after some period of time that is sufficient to provide a new aliquot of the sample fluid at the defined level 74, the controller 50 may instruct the fill pump 56 to stop pumping the sample fluid into the fluid container 14 (and may continue to operate the suction pump 58). Then, the controller 50 may instruct the rheometer 16 of FIG. 1 to complete rheology testing on the new aliquot of the sample fluid. In this way, multiple separate aliquots of the sample fluid may be separately tested in an efficient, automated process. It should be appreciated that the controller 50 may also receive signals (e.g., from a temperature sensor) indicative of a temperature of the sample fluid and control the temperature control system 18 of FIG. 1 to perform the rheology testing at different temperatures (e.g., as prescribed by testing protocols).

As shown, the cross-drilled passageway 78 includes a first portion 82 that extends from the opening 76 to a port 84 and a second portion 86 that extends from the outlet line 124 to a port 88. The first portion 82 intersects the second portion 86 to form the cross-drilled passageway 78. As shown, plugs 90, 92 may be positioned to close or to seal the ports 84, 88. The plugs 90, 92 may remain in place during the rheology testing, as well as during certain cleaning operations (e.g., flushing operations). However, the plugs 90, 92 may be removed to enable access to the cross-drilled passageway 78, such as to clear blockages via cleaning rods. Additionally, the cross-drilled passageway 78 extends through a wall 94 of the fluid container 14 (e.g., is surrounded by the wall 94 of the fluid container 14), which may provide a compact and/or secure structure for the fluid container 14 (e.g., one-piece at and/or below the defined level 74).

As noted herein, it should be appreciated that, in certain embodiments, the fluid testing system 10 may be devoid of the cross-drilled passageway 78 and/or the outlet line 124, and instead the inlet line 122 may provide the sample fluid to the fluid container 14 and also enable extraction of the sample fluid from the fluid container 14. Indeed, it should be appreciated that the fluid testing system 10 may include any combination of inlets and/or outlets in any suitable locations to provide the sample fluid to the fluid container 14 and also enable extraction of the sample fluid from the fluid container 14.

To carry out a cleaning process with the cleaning system 72, the controller 50 may instruct the cleaning pump 60 to operate at a cleaning pump rate to begin pumping cleaning fluid into the spray bar 40. In certain embodiments, the cleaning process may begin with pumping the cleaning fluid into the spray bar 40 while the fluid container 14 is devoid of the sample fluid and/or while the sample fluid is below the defined level 74 in the fluid container 14. For example, the sample fluid may be entirely removed from the fluid container 14 via a final draining process (e.g., after the rheology testing on one or more aliquots of the sample fluid), such as via operating the inlet line 122 as an outlet line and/or opening a valve at another exit port.

In certain cases, the sample fluid may leave a residue 96 (e.g., a ring of residue) on the inner surface 80 of the fluid container 14. The residue 96 may include remnants or portions of the sample fluid that at least temporarily adhere to or remain along the inner surface 80 of the fluid container 14, even after the sample fluid is drained or removed from the fluid container 14. As shown, the residue 96 may form at least along or proximate to the defined level 74 of the sample fluid within the fluid container 14.

In order to remove or wash away the residue 96, the controller 50 may instruct the cleaning pump 60 to operate at the cleaning pump rate to pump the cleaning fluid into the spray bar 40 (e.g., while the inlet line 122 and/or any ports at a bottom of the fluid container 14 are closed). The cleaning fluid may flow into the spray bar 40 and then exit through one or more cleaning fluid outlets 106 defined in the spray bar 40. In certain embodiments, the cleaning pump rate may pump the cleaning fluid at a rate between about 0.1 to 5 liters per minute (L/min), 0.5 to 4.5 L/min, 1 to 4 L/min, or 1.5 to 3.5 L/min. The cleaning pump rate may be sufficient to cause the cleaning fluid to spray or eject from the one or more cleaning fluid outlets 106. The cleaning pump rate may exceed the suction pump rate and/or the fill pump rate. However, in certain cases, the cleaning pump rate may be less than at least the suction pump rate. For example, the suction pump rate may be between about 2 to 10 L/min, 4 to 9 L/min, or 5 to 8 L/min. In any cases, various pump rates may be selected and utilized to facilitate efficient testing and cleaning operations disclosed herein.

The controller 50 may continue to operate the cleaning pump 60 to pump the cleaning fluid into the spray bar 40 until the cleaning fluid reaches the defined level 74 and/or the level limit switch port 28 of FIG. 1. For example, the controller 50 may receive an indication (e.g., a signal) that the cleaning fluid has reached or exceed the defined level 74 via a sensor along the outlet line 124, the level limit sensor at the level limit switch port 28, any other suitable sensor, a timing device, a flow meter, and/or any other suitable device. Then, in response to the indication, the controller 50 may control (e.g., shut off) the cleaning pump 60 to stop flow of the cleaning fluid into the spray bar 40. It should be appreciated that the controller 50 may instead continue to operate the cleaning pump 60 to pump the cleaning fluid into the spray bar 40 for some period of time after the indication, such as to provide additional agitation of the cleaning fluid within the fluid container 14. Further, once the cleaning fluid reaches the defined level 74, the cleaning fluid may be pumped via the suction pump 58 to flow through the opening 76, through the cross-drilled passageway 78, into the outlet line 124, and to the fluid drain 64 (or another designated drain) to maintain the cleaning fluid at the defined level 74.

A rotor of the rheometer 16 of FIG. 1 may be positioned in the chamber 81 of the fluid container 14 as the cleaning fluid fills the chamber 81 of the fluid container 14 and/or may be inserted into the chamber 81 of the fluid container 14 after the cleaning fluid reaches the defined level 74. In some cases, the rotor may be driven to rotate to facilitate or cause swirl of the cleaning fluid within the chamber 81 of the fluid container 14 as the cleaning fluid fills the chamber 81 of the fluid container 14 and/or with the cleaning fluid at the defined level 74. The rotor may be driven to rotate between about 600 to 1200 or 800 to 1000 revolutions per minute. In some cases, a respective rotor rotation rate during the cleaning process may exceed a respective rotor rotation rate during a testing process (e.g., rheology testing), as this may cause the cleaning fluid to swirl along the inner surface 80 above the residue 96 left behind due to the testing process (e.g., due to greater centrifugal acceleration of the cleaning fluid).

In certain embodiments, the temperature control system 18 of FIG. 1 may heat (or cool) the fluid container 14 to thereby heat (or cool) contents (e.g., the cleaning fluid and/or the residue 96) in the fluid container 14 as the cleaning fluid fills the chamber 81 of the fluid container 14 and/or with the cleaning fluid at the defined level 74. In any case, with the cleaning fluid in the fluid container 14, the controller 50 may operate the rotor of the rheometer and/or the temperature control system 18 of FIG. 1 in this manner for a period of time (e.g., according to cleaning protocols; 30, 60, 90, 120, or more seconds). Then, the cleaning fluid may be entirely removed from the fluid container 14 via a cleaning fluid draining process, such as via operating the inlet line 122 as an outlet line and/or opening a valve at another exit port. It should be appreciated that the controller 50 may operate the cleaning system 72 to carry out multiple cleaning processes in a row (e.g., one right after another). Once the cleaning process or the multiple cleaning processes are complete, the controller 50 may then operate the fill pump 56 to provide the sample fluid to the fluid container 14 and so forth, as described herein.

FIG. 2 includes insets that shows alternative views of the spray bar 40 to facilitate discussion. In particular, FIG. 2 includes a first inset 100 that shows a perspective view of an embodiment of the spray bar 40, as well as a second inset 102 that shows a cross-sectional top view of an embodiment of the spray bar 40.

As shown, the spray bar 40 is an annular structure that extends circumferentially along the inner surface 80 of the fluid container 14 (e.g., the spray bar 40 is within the chamber 81). However, it should be appreciated that the spray bar 40 may have any suitable form or shape. Additionally, while FIG. 2 illustrates one spray bar 40, it should be appreciated that multiple spray bars may be provided (e.g., stacked along the vertical axis 30 and/or distributed or spaced apart along the circumferential axis 34). As shown, the one or more cleaning fluid outlets 106 include multiple cleaning fluid outlets distributed or spaced apart along the circumferential axis 34. It should be appreciated that the one or more cleaning fluid outlets 106 may include any suitable number of cleaning fluid outlets, such as 1, 2, 3, 4, 5, 10, 15, 20, or more.

As shown, the one or more cleaning fluid outlets 106 are formed (e.g., machined in the spray bar 40) to open to a radially-inner surface of the spray bar 40 so as to spray or eject the cleaning fluid radially inwardly, as shown by arrow 107. However, it should be appreciated that the one or more cleaning fluid outlets 106 may instead be open to a radially-outer surface of the spray bar 40 so as to spray or eject the cleaning fluid radially outwardly. For example, the spray bar 40 may be offset from the inner surface 80 of the fluid container 14 (e.g., have a smaller diameter) such that the one or more cleaning fluid outlets 106 that are open to the radially-outer surface of the spray bar 40 are able to spray or eject the cleaning fluid radially outwardly onto the inner surface 80 of the fluid container 14. Indeed, the spray bar 40 may include at least one of the one or more cleaning fluid outlets 106 formed to open to the radially-inner surface of the spray bar 40 and at least one of the one or more cleaning fluid outlets 106 formed to open to the radially-outer surface of the spray bar 40.

Further, the one or more cleaning fluid outlets 106 may be oriented along the radial axis 32, which may enable or cause the one or more cleaning fluid outlets 106 to spray or eject the cleaning fluid along the radial axis 32 (e.g., as shown by the arrows 107). However, the one or more cleaning fluid outlets 106 may be oriented at an angle relative to the radial axis 32, such as to spray or eject the cleaning fluid with a component along the circumferential axis 34 to impart swirl of the cleaning fluid within the fluid container 14, to contact the residue 96 at an angle that is more likely to loosen the residue 96, and so forth. Additionally or alternatively, the one or more cleaning fluid outlets 106 may be oriented at an angle relative to the radial axis 32, such as to spray or eject the cleaning fluid with a component along the vertical axis 30 to direct the cleaning fluid to the residue 96 below the spray bar 40, to contact the residue 96 at an angle that is more likely to loosen the residue 96, and so forth. Further, the one or more cleaning fluid outlets 106 of the spray bar 40 may have different orientations, such as one or more aligned with the radial axis 32, one or more at a first angle relative to the radial axis 32 and extending in a first direction relative to the circumferential axis 34 (e.g., in a direction of rotation of the rotor of the rheometer 16 of FIG. 1 during the cleaning process), one or more at a second angle relative to the radial axis 32 and extending in a second direction relative to the circumferential axis 34 (e.g., opposite the direction of rotation of the rotor of the rheometer of FIG. 1 during the cleaning process), one or more extending in a third direction along the vertical axis 30 (e.g., downward), or any combination thereof, which may induce swirl and/or turbulence within the cleaning fluid in the fluid container 14.

As shown, one cleaning fluid inlet line 70 provides the cleaning fluid to an internal channel 104 (e.g., annular channel) of the spray bar 40, and the internal channel 104 is fluidly coupled to each of the one or more cleaning fluid outlets 106 to distribute the cleaning fluid to each of the one or more cleaning fluid outlets 106. It should be appreciated that other configurations are envisioned, such as multiple cleaning fluid inlet lines 70, multiple internal channels 104, and/or manifolds to distribute the cleaning fluid as described herein. Further, as shown, the cleaning fluid inlet line 70 may extend to the spray bar 40 from a position above the spray bar 40 and/or an upper edge of the fluid container 14 (e.g., relative to the vertical axis 30). However, the cleaning fluid inlet line 70 may extend to the spray bar 40 through the wall 94 of the fluid container 14, from another position below the spray bar 40 and/or a bottom surface of the fluid container 14, or any combination thereof.

In FIG. 2, the spray bar 40 is in a fixed location (e.g., static) within the fluid container 14. The spray bar 40 may be coupled to the fluid container 14, such as via one or more fasteners (e.g., threaded fasteners, welds, and/or adhesives). For example, in certain embodiments, the spray bar 40 may be supported on brackets 108 that extend radially inwardly from the inner surface 80 of the fluid container 14. In such cases, the brackets 108 may be coupled to the inner surface 80 of the fluid container 14 via one or more fasteners and/or may be integrally formed with the inner surface 80 of the fluid container 14 (e.g., via machining, three-dimensional printing, or other manufacturing techniques). Further, while the spray bar 40 may be supported by the brackets 108 below the spray bar 40, it should be appreciated that the spray bar 40 may instead be suspended from brackets or another structure above the spray bar 40. Indeed, it is envisioned that the fluid testing system 10 may implement any suitable techniques to position the spray bar 40 within the fluid container 14.

As shown, the spray bar 40 is positioned above the defined level 74 relative to the vertical axis 30. This position may enable the one or more cleaning fluid outlets 106 to spray or eject the cleaning fluid at the residue 96, and impact or contact between the cleaning fluid and the residue 96 may cause the residue 96 to loosen or wash away from the inner surface 80 of the fluid container 14. In some cases, this position may enable the one or more cleaning fluid outlets 106 to spray or eject the cleaning fluid above the residue 96, which may enable the cleaning fluid to fall (e.g., via gravity) along the inner surface 80 to eventually contact the residue 96 to cause the residue 96 to loosen or wash away from the inner surface 80 of the fluid container 14.

The cleaning fluid may be a liquid, a gas, or a combination thereof. For example, the cleaning fluid may include any suitable base fluid, such as diesel, synthetic oil, mineral oil, water, detergent, compressed air, nitrogen gas, or any combination thereof, that is capable of displacing the residue 96 and rinsing the inner surface 80 of the fluid container 14. Thus, the cleaning fluid ejected from the one or more cleaning fluid outlets 106 may form a liquid or gas curtain (e.g., annular curtain) that acts to remove (e.g., washes, blows) the residue 96 from the inner surface 80 of the fluid container 14. In certain embodiments, different types of cleaning fluids may be utilized together (e.g., sequentially; at one time or simultaneously). For example, the cleaning system 72 may first eject a gas type cleaning fluid to loosen the residue 96, and then the cleaning system 72 may then eject a liquid type cleaning fluid to wash the residue 96. This may also be advantageous as wetting the residue 96 with the liquid type cleaning fluid soon after application of the gas type cleaning fluid blocks or reduces likelihood of drying the residue 96 (which could make the residue 96 more difficult to remove).

Figure 3:
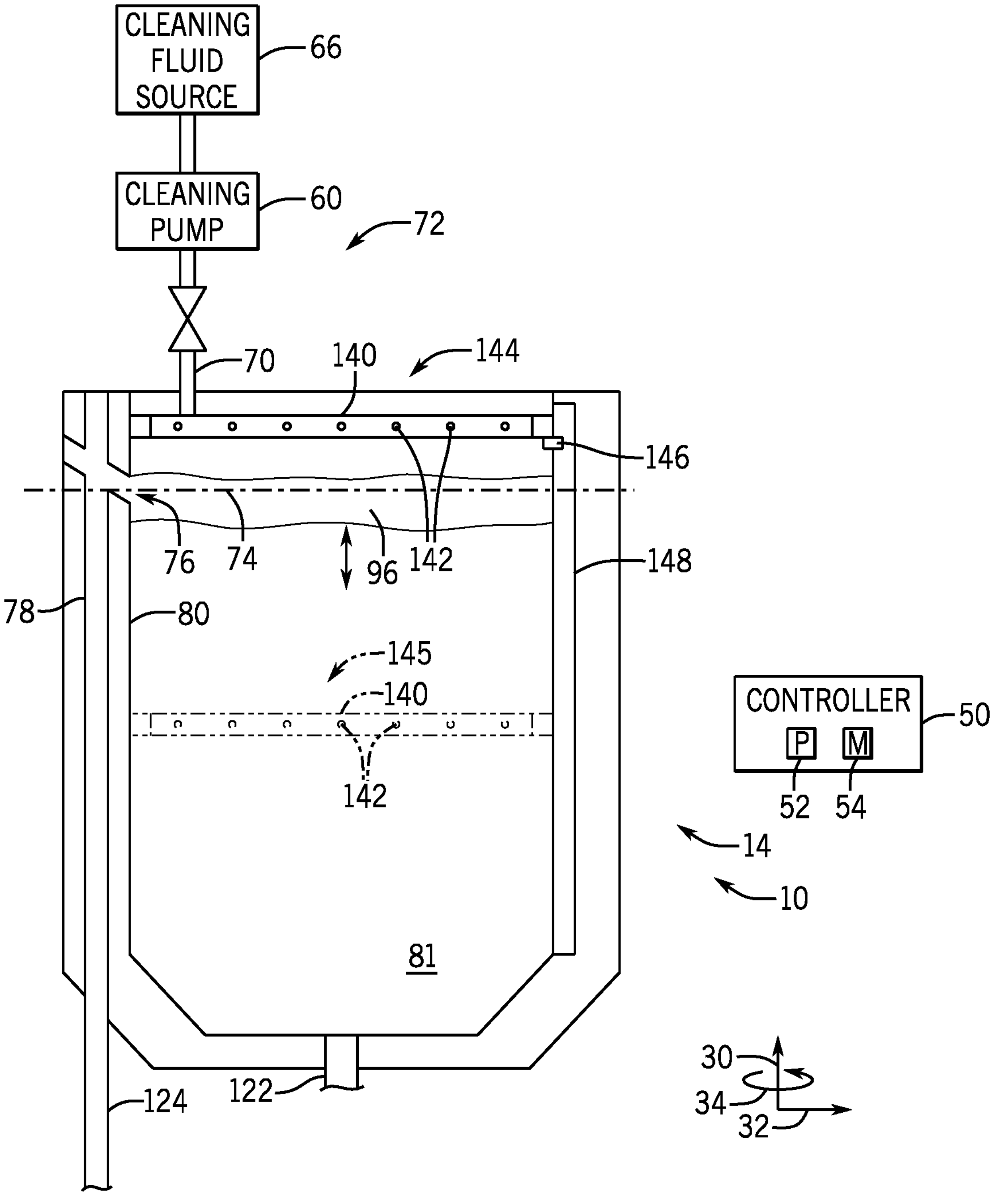
FIG. 3 is a cross-sectional side view of a fluid container that may be utilized as part of the fluid testing system of FIG. 1, wherein the fluid container includes an adjustable spray bar, in accordance with an embodiment of the present disclosure.

FIG. 3 is a cross-sectional side view of an embodiment of the fluid container 14 that may be utilized as part of the fluid testing system 10, wherein the fluid container 14 includes an adjustable spray bar 140. In order to remove or wash away the residue 96, the controller 50 may instruct the cleaning pump 60 to operate at the cleaning pump rate to pump the cleaning fluid into the adjustable spray bar 140. The cleaning fluid may flow into the adjustable spray bar 140 and then exit through one or more cleaning fluid outlets 142 defined in the adjustable spray bar 140.

The controller 50 may continue to operate the cleaning pump 60 to pump the cleaning fluid into the adjustable spray bar 140 until the cleaning fluid reaches the defined level 74 and/or the level limit switch port 28 of FIG. 1. Then, the controller 50 may control (e.g., shut off) the cleaning pump 60 to stop flow of the cleaning fluid into the adjustable spray bar 140. Further, once the cleaning fluid reaches the defined level 74, the cleaning fluid may be pumped to flow through the opening 76, through the cross-drilled passageway 78, and into the outlet line 124 to maintain the cleaning fluid at the defined level 74.

The rotor of the rheometer 16 of FIG. 1 may be driven to rotate to facilitate or cause swirl of the cleaning fluid within the chamber 81 of the fluid container 14 as the cleaning fluid fills the chamber 81 of the fluid container 14 and/or with the cleaning fluid at the defined level 74. The temperature control system 18 of FIG. 1 may heat (or cool) the fluid container 14 to thereby heat (or cool) contents (e.g., the cleaning fluid and/or the residue 96) in the fluid container 14 as the cleaning fluid fills the chamber 81 of the fluid container 14 and/or with the cleaning fluid at the defined level 74. After some period of time, the cleaning fluid may be entirely removed from the fluid container 14 via a cleaning fluid draining process, such as via operating the inlet line 122 as an outlet line and/or opening a valve at another exit port. Once the cleaning process or the multiple cleaning processes are complete, the controller 50 may then provide instructions to pump the sample fluid to the fluid container 14 and so forth, as described herein.

As shown, the adjustable spray bar 140 is an annular structure that extends circumferentially along the inner surface 80 of the fluid container 14. However, it should be appreciated that the adjustable spray bar 140 may have any suitable form or shape. Additionally, it should be appreciated that multiple adjustable spray bars may be provided (e.g., stacked along the vertical axis 30 and/or distributed or spaced apart along the circumferential axis 34). As shown, the one or more cleaning fluid outlets 142 include multiple cleaning fluid outlets distributed or spaced apart along the circumferential axis 34. It should be appreciated that the one or more cleaning fluid outlets 142 may include any suitable number of cleaning fluid outlets, such as 1, 2, 3, 4, 5, 10, 15, 20, or more.

As shown, the one or more cleaning fluid outlets 142 are formed (e.g., machined in the adjustable spray bar 140) to open to a radially-inner surface of the spray bar 40. However, it should be appreciated that the one or more cleaning fluid outlets 142 may instead be open to a radially-outer surface of the adjustable spray bar 140. Further, the one or more cleaning fluid outlets 142 may be oriented along the radial axis 32, at an angle relative to the radial axis 32, or any combination thereof. The adjustable spray bar 140 may include an internal channel to distribute the cleaning fluid from the cleaning fluid inlet line 70 to the one or more cleaning fluid outlets 142.

In FIG. 3, the adjustable spray bar 140 is configured to move (e.g., adjust) within the fluid container 14. For example, the adjustable spray bar 140 is configured to travel or slide within the fluid container 14 along the vertical axis 30. The adjustable spray bar 140 may travel over any suitable vertical distance, such as from an upper edge to a bottom surface of the fluid container 14 or any portion therebetween. To facilitate discussion, FIG. 3 illustrates the adjustable spray bar 140 in a first position 144 (e.g., upper position; above the defined level 74) and a second position 145 (e.g., in dashed lines; lower position; below the defined level 74).

The cleaning system 72 may include any suitable drive system to move the adjustable spray bar 140 within the fluid container 14. For example, a drive system may include a drive assembly 146 with a motor (e.g., hydraulic, pneumatic, electric) that drives one or more wheels of a bogie (e.g., bracket) that supports the adjustable spray bar 140 along tracks 148 (e.g., vertical tracks; recesses). In such cases, the drive system may include multiple assemblies distributed circumferentially about the adjustable spray bar 140. Further, the multiple assemblies may be circumferentially offset from the cross-drilled passageway 78 so as to provide additional or sufficient space for the cross-drilled passageway 78, for example. As another example, the drive system may include a biasing member, which may bias the adjustable spray bar 140 toward the bottom of the fluid container 14. Then, as the cleaning fluid fills the fluid container 14, the cleaning fluid may overcome a biasing force of the biasing member to raise the adjustable spray bar 140 within the fluid container 14. As another example, the drive system may include an adjustable cable connected to the adjustable spray bar 140 and wrapped around a pulley assembly that rotates to lower and raise the adjustable spray bar 140 within the fluid container 14. As another example, the drive system may include a magnetic drive, wherein a magnet is driven to move vertically outside of the fluid container 14 and the adjustable spray bar 140 moves within the fluid container 14 based on the magnet (e.g., to follow the magnet). It should be appreciated that any features, combinations of features, and variations described with reference to FIGS. 1 and 2 may be incorporated into FIG. 3.

Figure 4:
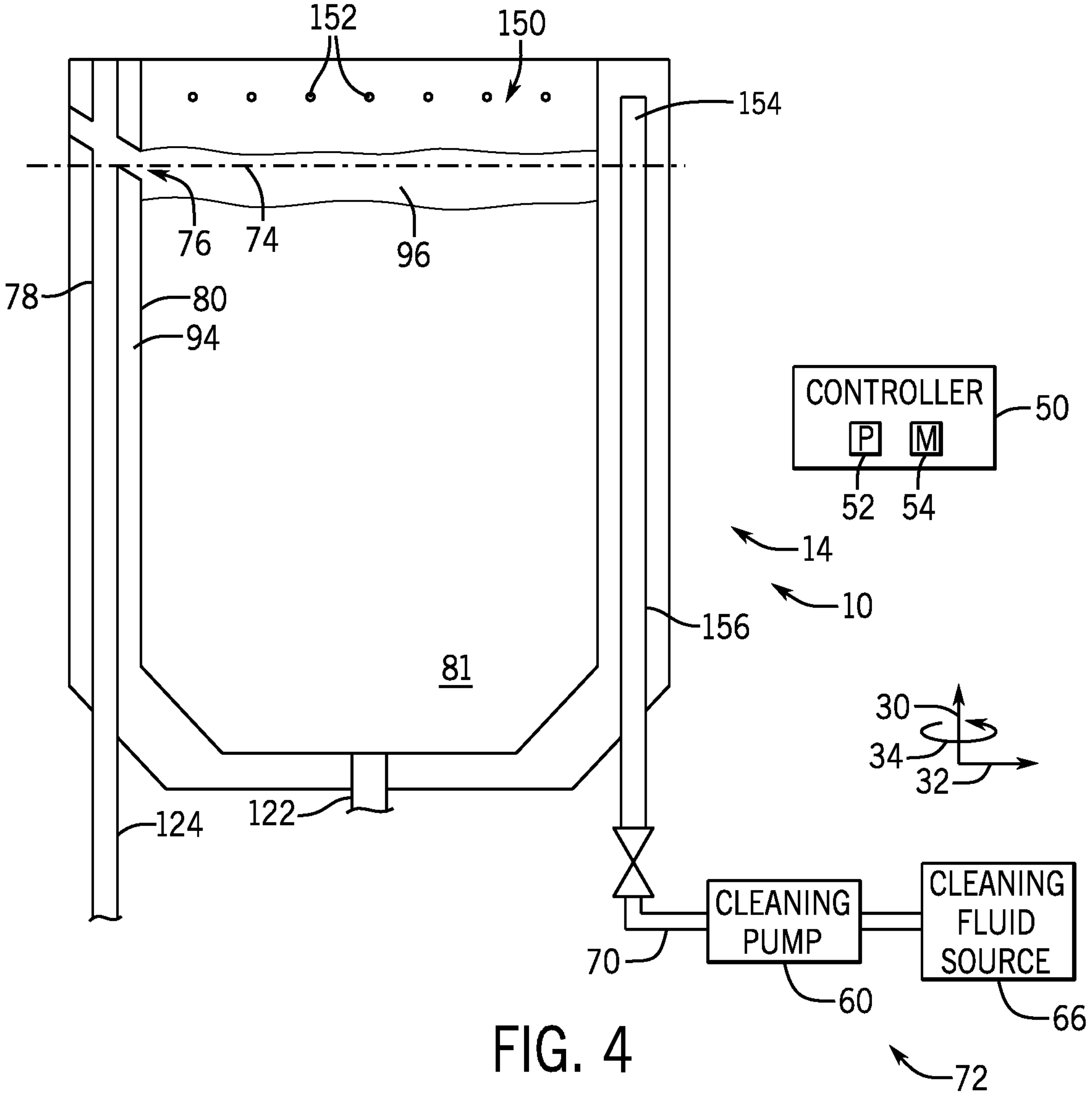
FIG. 4 is a cross-sectional side view of a fluid container that may be utilized as part of the fluid testing system of FIG. 1, wherein the fluid container includes a side wall with an integrated spray bar, in accordance with an embodiment of the present disclosure.

FIG. 4 is a cross-sectional side view of an embodiment of the fluid container 14 that may be utilized as part of the fluid testing system 10, wherein the fluid container 14 includes the wall 94 with an integrated spray bar 150. In order to remove or wash away the residue 96, the controller 50 may instruct the cleaning pump 60 to operate at the cleaning pump rate to pump the cleaning fluid into the integrated spray bar 150. The cleaning fluid may flow into the integrated spray bar 150 and then exit through one or more cleaning fluid outlets 152 of the integrated spray bar 150.

The controller 50 may continue to operate the cleaning pump 60 to pump the cleaning fluid into the integrated spray bar 150 until the cleaning fluid reaches the defined level 74 and/or the level limit switch port 28 of FIG. 1. Then, the controller 50 may control (e.g., shut off) the cleaning pump 60 to stop flow of the cleaning fluid into the integrated spray bar 150. Further, once the cleaning fluid reaches the defined level 74, the cleaning fluid may be pumped to flow through the opening 76, through the cross-drilled passageway 78, and into the outlet line 124 to maintain the cleaning fluid at the defined level 74.

The rotor of the rheometer 16 of FIG. 1 may be driven to rotate to facilitate or cause swirl of the cleaning fluid within the chamber 81 of the fluid container 14 as the cleaning fluid fills the chamber 81 of the fluid container 14 and/or with the cleaning fluid at the defined level 74. As described herein, in certain embodiments, the rotor may rotate in a first direction during the testing process, and the rotor may rotate in a second direction (e.g., opposite the first direction) during the cleaning process, which may facilitate removing the residue 96. In certain embodiments, the rotor may alternate rotation in the first direction and the second direction during the cleaning process, which may induce swirl and facilitate removing the residue 96. It should also be appreciated that, in certain embodiments, the rotor may rotate in the first direction during the testing process and the cleaning process (e.g., without reversing to the second direction during the cleaning process). The temperature control system 18 of FIG. 1 may heat (or cool) the fluid container 14 to thereby heat (or cool) contents (e.g., the cleaning fluid and/or the residue 96) in the fluid container 14 as the cleaning fluid fills the chamber 81 of the fluid container 14 and/or with the cleaning fluid at the defined level 74. After some period of time, the cleaning fluid may be entirely removed from the fluid container 14 via a cleaning fluid draining process, such as via operating the inlet line 122 as an outlet line and/or opening a valve at another exit port. Once the cleaning process or the multiple cleaning processes are complete, the controller 50 may then provide instructions to pump the sample fluid to the fluid container 14 and so forth, as described herein.

As shown, the integrated spray bar 150 is positioned above the defined level 74 relative to the vertical axis 30. Further, the integrated spray bar 150 extends circumferentially within the wall 94 of the fluid container 14. In certain embodiments, the integrated spray bar 150 is an annular structure. In certain embodiments, the integrated spray bar 150 is an arc structure, such as a c-shaped structure or other arc shape that extends about a portion of the fluid container 14. The arc structure may enable placement of the cross-drilled passageway 78 within the wall 94 of the fluid container 14. For example, opposed ends of the arc structure may be separated by a gap (e.g., along the circumferential axis 34), and the cross-drilled passageway 78 may extend or be placed within the gap (e.g., extend along the vertical axis 30 through the gap). However, it should be appreciated that the integrated spray bar 150 may have any suitable form or shape. Additionally, it should be appreciated that multiple integrated spray bars may be provided (e.g., stacked along the vertical axis 30 and/or distributed or spaced apart along the circumferential axis 34). As shown, the one or more cleaning fluid outlets 152 include multiple cleaning fluid outlets distributed or spaced apart along the circumferential axis 34. It should be appreciated that the one or more cleaning fluid outlets 152 may include any suitable number of cleaning fluid outlets, such as 1, 2, 3, 4, 5, 10, 15, 20, or more.

The integrated spray bar 150 may include or be an internal channel 154 defined and formed (e.g., machined) in the wall 94 of the fluid container 14. For example, the cleaning system 72 may include the cleaning fluid inlet line 70 that connects to a cleaning fluid passageway 156 that extends vertically within the wall 94 of the fluid container 14 to the internal channel 154. The internal channel 154 may be the annular structure, the arc structure, or other suitable structure that extends circumferentially within the wall 94 of the fluid container 14 to distribute the cleaning fluid to the one or more cleaning fluid outlets 152. That is, the internal channel 154 is fluidly coupled to the cleaning fluid inlet line 70 (e.g., via the cleaning fluid passageway 156) and the one or more cleaning fluid outlets 152 to distribute the cleaning fluid to the one or more cleaning fluid outlets 152.

The one or more cleaning fluid outlets 152 are formed (e.g., machined) to extend between the internal channel 154 and the inner surface 80 of the fluid container 14. Further, the one or more cleaning fluid outlets 152 may be oriented along the radial axis 32, at an angle relative to the radial axis 32, or any combination thereof. It should be appreciated that any features, combinations of features, and variations described with reference to FIGS. 1-3 may be incorporated into FIG. 4. For example, while FIG. 4 illustrates the cleaning fluid inlet line 70 positioned to connect to the internal channel 154 (e.g., via the cleaning fluid passageway 156) from below the fluid container 14, it should be appreciated that the cleaning fluid inlet line 70 may connect to the internal channel 154 from above the fluid container 14 or by extending radially through the wall 94 of the fluid container 14.

Figure 5:
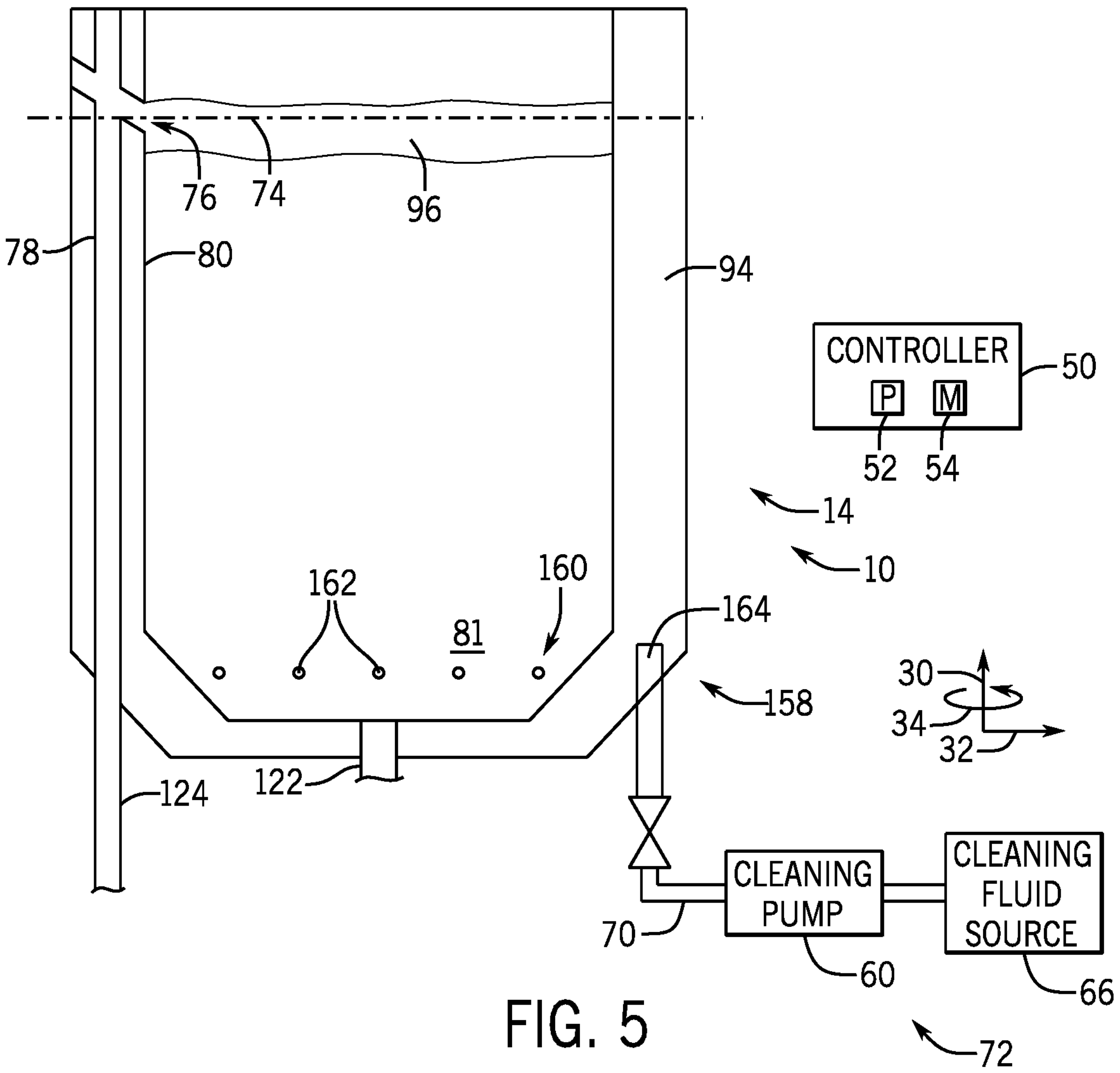
FIG. 5 is a cross-sectional side view of a fluid container that may be utilized as part of the fluid testing system of FIG. 1, wherein the fluid container includes a lower portion with an integrated spray bar, in accordance with an embodiment of the present disclosure.

FIG. 5 is a cross-sectional side view of an embodiment of the fluid container 14 that may be utilized as part of the fluid testing system 10, wherein the fluid container 14 includes a lower portion 158 with an integrated spray bar 160. In order to remove or wash away the residue 96, the controller 50 may instruct the cleaning pump 60 to operate at the cleaning pump rate to pump the cleaning fluid into the integrated spray bar 160. The cleaning fluid may flow into the integrated spray bar 160 and then exit through one or more cleaning fluid outlets 162 of the integrated spray bar 160.

The controller 50 may continue to operate the cleaning pump 60 to pump the cleaning fluid into the integrated spray bar 160 until the cleaning fluid reaches the defined level 74 and/or the level limit switch port 28 of FIG. 1. Then, the controller 50 may control (e.g., shut off) the cleaning pump 60 to stop flow of the cleaning fluid into the integrated spray bar 160. Further, once the cleaning fluid reaches the defined level 74, the cleaning fluid may be pumped to flow through the opening 76, through the cross-drilled passageway 78, and into the outlet line 124 to maintain the cleaning fluid at the defined level 74.

The rotor of the rheometer 16 of FIG. 1 may be driven to rotate to facilitate or cause swirl of the cleaning fluid within the chamber 81 of the fluid container 14 as the cleaning fluid fills the chamber 81 of the fluid container 14 and/or with the cleaning fluid at the defined level 74. The temperature control system 18 of FIG. 1 may heat (or cool) the fluid container 14 to thereby heat (or cool) contents (e.g., the cleaning fluid and/or the residue 96) in the fluid container 14 as the cleaning fluid fills the chamber 81 of the fluid container 14 and/or with the cleaning fluid at the defined level 74. After some period of time, the cleaning fluid may be entirely removed from the fluid container 14 via a cleaning fluid draining process, such as via operating the inlet line 122 as an outlet line and/or opening a valve at another exit port. Once the cleaning process or the multiple cleaning processes are complete, the controller 50 may then provide instructions to pump the sample fluid to the fluid container 14 and so forth, as described herein.

As shown, the integrated spray bar 160 extends circumferentially within the wall 94 of the fluid container 14. In certain embodiments, the integrated spray bar 160 is an annular structure. In certain embodiments, the integrated spray bar 160 is an arc structure, such as to enable placement of the cross-drilled passageway 78 within the wall 94 of the fluid container 14. However, it should be appreciated that the integrated spray bar 160 may have any suitable form or shape. Additionally, it should be appreciated that multiple integrated spray bars may be provided (e.g., stacked along the vertical axis 30 and/or distributed or spaced apart along the circumferential axis 34). As shown, the one or more cleaning fluid outlets 162 include multiple cleaning fluid outlets distributed or spaced apart along the circumferential axis 34. It should be appreciated that the one or more cleaning fluid outlets 162 may include any suitable number of cleaning fluid outlets, such as 1, 2, 3, 4, 5, 10, 15, 20, or more.

The integrated spray bar 160 may include or be an internal channel 164 defined and formed (e.g., machined) in the wall 94 of the fluid container 14. For example, the cleaning system 72 may include the cleaning fluid inlet line 70 that connects to the internal channel 164. The internal channel 164 may be the annular structure, the arc structure, or other suitable structure that extends circumferentially within the wall 94 of the fluid container 14 to distribute the cleaning fluid to the one or more cleaning fluid outlets 162. That is, the internal channel 164 is fluidly coupled to the cleaning fluid inlet line 70 (e.g., via a cleaning fluid passageway) and the one or more cleaning fluid outlets 162 to distribute the cleaning fluid to the one or more cleaning fluid outlets 162. In certain embodiments, the cleaning fluid may be provided via the inlet line 122, which connects to the internal channel 164 (e.g., the inlet line 122 is utilized to provide the cleaning fluid instead of the cleaning fluid inlet line 70). In such cases, some of the cleaning fluid may be provided to the chamber 81 of the fluid container 14 via the inlet line 122 (e.g., via a first opening), and some of the cleaning fluid may be diverted to the internal channel 164 to enter the chamber 81 of the fluid container 14 via the one or more cleaning fluid outlets 162 (e.g., having a smaller diameter than the first opening to generate a "jet" or spray effect).

The one or more cleaning fluid outlets 162 are formed (e.g., machined) to extend between the internal channel 164 and the inner surface 80 of the fluid container 14. As shown, the one or more cleaning fluid outlets 162 and the internal channel 164 are positioned in the lower portion 158 of the fluid container 14, such as below the defined level 74 relative to the vertical axis 30. Further, in this position, the one or more cleaning fluid outlets 162 may be formed in a tapered portion of the inner surface 80 of the fluid container 14 (e.g., an inner diameter defined by the inner surface 80 increases from a bottom surface of the chamber 81 toward an intermediate portion of the fluid container 14).

Further, the one or more cleaning fluid outlets 162 may be oriented along the radial axis 32, at an angle relative to the radial axis 32 (e.g., upwardly along the vertical axis 30), or any combination thereof. It should be appreciated that any features, combinations of features, and variations described with reference to FIGS. 1-4 may be incorporated into FIG. 5. For example, while FIG. 5 illustrates the cleaning fluid inlet line 70 positioned to connect to the internal channel 164 from below the fluid container 14, it should be appreciated that the cleaning fluid inlet line 70 may connect to the internal channel 164 from above the fluid container 14 or by extending radially through the wall 94 of the fluid container 14.

Figure 7:
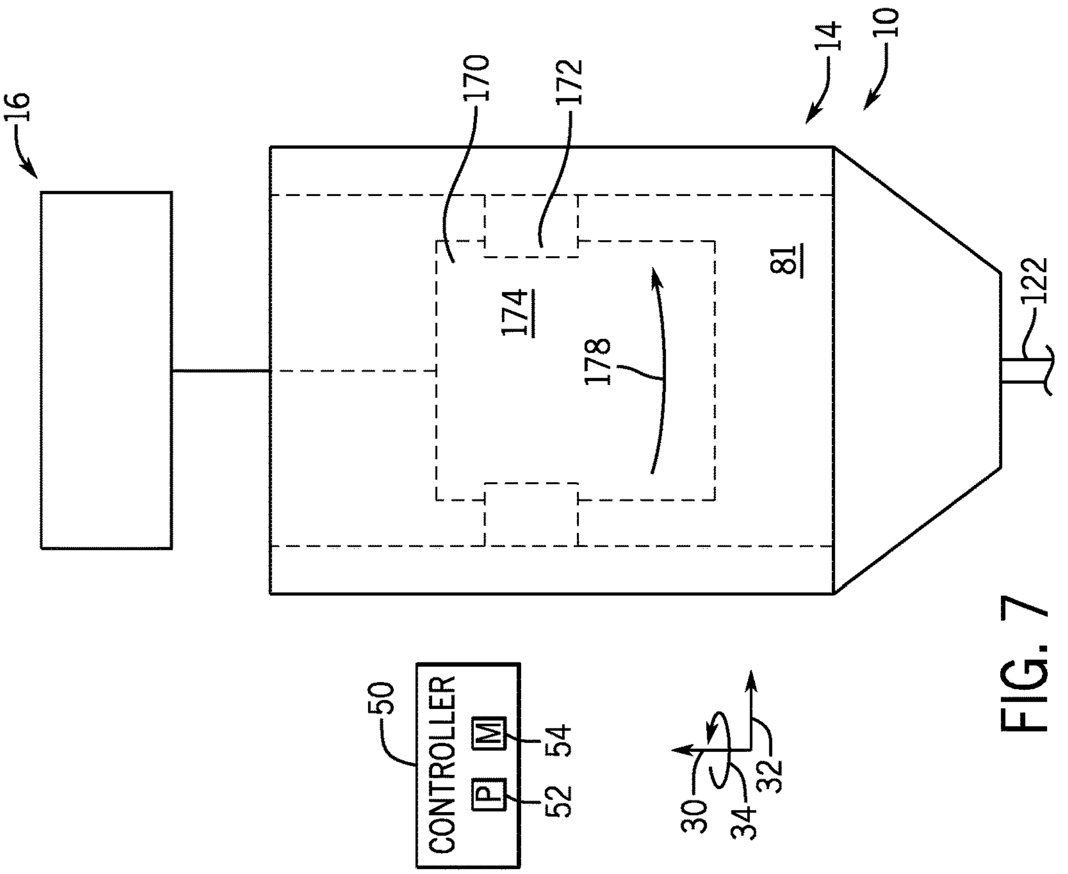
FIG. 7 is a cross-sectional side view of the fluid container of FIG. 6, wherein the rotor within the fluid container includes the one or more wipers in an extended configuration, in accordance with an embodiment of the present disclosure.
Figure 6:
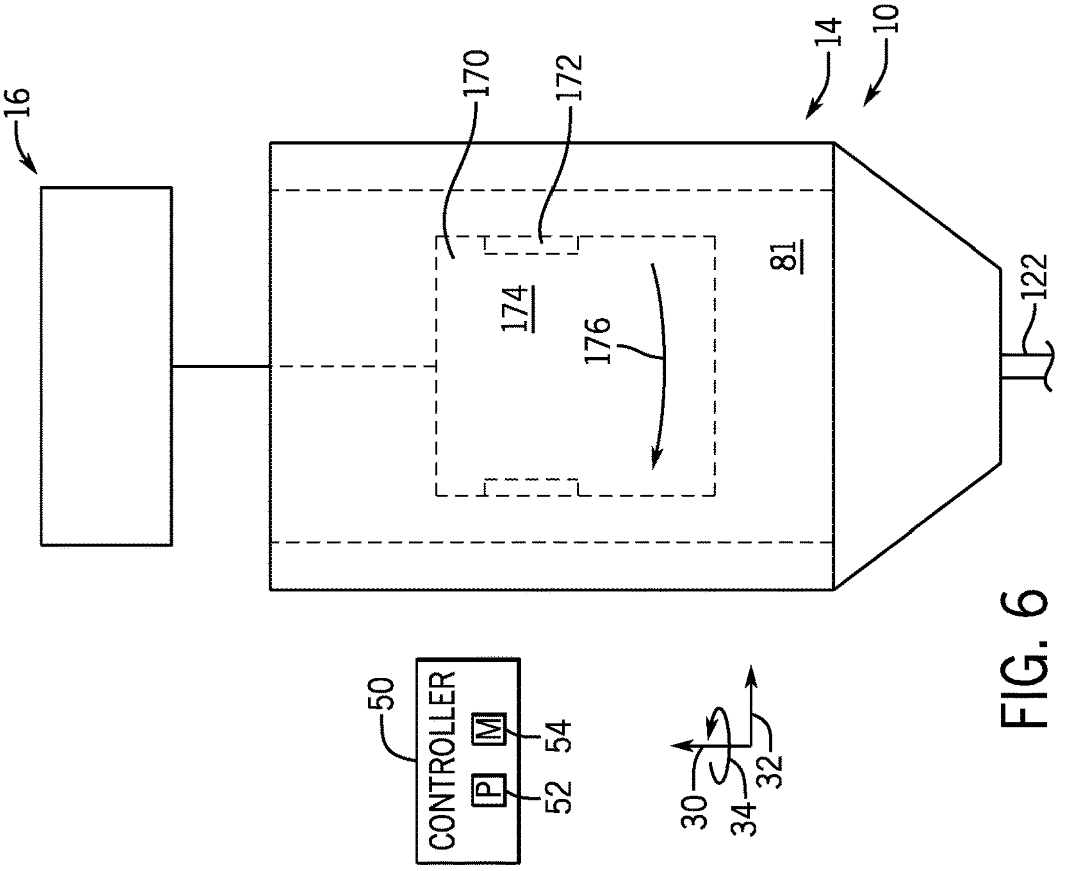
FIG. 6 is a cross-sectional side view of a fluid container that may be utilized as part of the fluid testing system of FIG. 1, wherein a rotor within the fluid container includes one or more wipers in a retracted configuration, in accordance with an embodiment of the present disclosure.

FIG. 6 is a cross-sectional side view of an embodiment of the fluid container 14 that may be utilized as part of the fluid testing system 10, wherein a rotor 170 within the fluid container 14 includes one or more wipers 172 in a retracted configuration. FIG. 7 is a cross-sectional side view of an embodiment of the fluid container 14, wherein the rotor 170 within the fluid container 14 includes the one or more wipers 172 in an extended configuration. In the retracted configuration, the one or more wipers 172 may be withdrawn into a body 174 of the rotor 170, such as withdrawn into a recess formed in an outer surface (e.g., a radially-outer surface) of the body 174 of the rotor 170. In the extended configuration, the one or more wipers 172 may extend from the body 174 of the rotor 170, such as extend from the outer surface (e.g., radially outwardly from the outer surface) of the body 174 of the rotor 170.

In certain embodiments, in the extended configuration, at least one of the one or more wipers 172 may contact the inner surface 80 of the fluid container 14. In certain embodiments, in the extended configuration, at least one of the one or more wipers 172 does not contact the inner surface 80 of the fluid container 14, but instead extends toward the inner surface 80 of the fluid container 14 to induce swirl of the cleaning fluid and agitation of the residue along the inner surface 80 of the fluid container 14.

In order to remove or wash away the residue within the fluid container 14, the controller 50 may instruct the cleaning pump to operate at the cleaning pump rate to pump the cleaning fluid into the fluid container 14, such as via the inlet line 122, any of the spray bars disclosed herein, or any combination thereof. The controller 50 may continue to operate the cleaning pump to pump the cleaning fluid into the fluid container 14, such as until the cleaning fluid reaches the defined level and/or the level limit switch port of FIG. 1. In certain embodiments, the controller 50 may control (e.g., shut off) the cleaning pump to stop flow of the cleaning fluid into the fluid container 14.

The rotor 170 may be part of the rheometer 16 and may be driven (e.g., via a rotary actuator) to rotate to facilitate or cause swirl of the cleaning fluid within the chamber 81 of the fluid container 14 as the cleaning fluid fills the chamber 81 of the fluid container 14 and/or with the cleaning fluid at the defined level. In certain embodiments, the one or more wipers 172 may be actively driven (e.g., via a linear actuator) to adjust from the retracted configuration to the extended configuration.

In certain embodiments, the one or more wipers 172 may be passively driven (e.g., via the rotation of the rotor 170) to adjust from the retracted configuration to the extended configuration. For example, the rotation of the rotor 170 may generate sufficient radially outward force (e.g., centrifugal force) on the one or more wipers 172 to cause the one or more wipers 172 to adjust from the retracted configuration to the extended configuration. To assist with these techniques, the rotor 170 may rotate at a first rotor rotation rate during the testing process to maintain the one or more wipers 172 in the retracted configuration during the testing process, and the rotor 170 may rotate at a second rotor rotation rate (e.g., greater than the first rotor rotation rate) during the cleaning process to adjust the one or more wipers to the extended configuration during the cleaning process. Additionally or alternatively to assist with these techniques, the rotor 170 may rotate in a first direction (e.g., shown by arrow 176) during the testing process to maintain the one or more wipers 172 in the retracted configuration during the testing process, and the rotor 170 may rotate in a second direction (e.g., shown by arrow 178, opposite the first direction) during the cleaning process to adjust the one or more wipers to the extended configuration during the cleaning process. In some such cases, the one or more wipers 172 may be coupled to the body 174 of the rotor 170 via respective directional hinges that cause the one or more wipers 172 to extend (e.g., open) away from the body 174 of the rotor 170 when upon rotation in the second direction. In any case, the one or more wipers 172 may be adjusted to return to the retracted configuration after completion of the cleaning process and may remain in the retracted configuration during the testing process.

As shown, the one or more wipers 172 include multiple wipers positioned circumferentially about the body 174 of the rotor 170, such as spaced apart at discrete locations circumferentially about the body 174 of the rotor 170. Further, the one or more wipers 172 include a rectangular (e.g., square) shape with a flat edge facing the inner surface 80 of the fluid container 14. However, it should be appreciated that the one or more wipers 172 may have any suitable arrangement, form, and/or or shape. For example, the multiple wipers may be arranged in multiple rows stacked along the vertical axis 30, and the one or more wipers 172 may include any suitable number of wipers, such as 1, 2, 3, 4, 5, 10, 15, 20, or more. In certain embodiments, the rotor 170 may be raised and lowered within the fluid container 14 to position the one or more wipers 172 adjacent to the residue (e.g., above the defined level; at or overlapped with the defined level) to enable the one or more wipers 172 in the extended configuration to wipe and/or loosen the residue, for example. In certain embodiments, the rotor may be raised and lowered within the fluid container 14 while the one or more wipers 172 are in the extended configuration to enable the one or more wipers 172 to wipe and/or agitate the cleaning fluid at multiple positions along the vertical axis 30 during the cleaning process. In certain embodiments, such movement of the rotor 170 may be coordinated with operations to fill and/or drain the fluid container 14 with the cleaning fluid, such as to maintain (e.g., approximately, such as based on timing, flow rate, and/or dimension data) the one or more wipers 172 proximate to (e.g., above, below, in front of, overlapped with) an upper fluid surface of the cleaning fluid as the cleaning fluid fills and/or drains from the fluid container 14. In certain embodiments, the one or more wipers 172 may be configured to move (e.g., slide along the vertical axis 30) relative to the body 174 of the rotor 170, such as via drive components integrated into the one or more wipers 172 and/or the body 174 of the rotor 170.

As described herein, the temperature control system may heat (or cool) the fluid container 14 to thereby heat (or cool) contents (e.g., the cleaning fluid and/or the residue) in the fluid container 14 as the cleaning fluid fills the chamber 81 of the fluid container 14 and/or with the cleaning fluid at the defined level. After some period of time, the cleaning fluid may be entirely removed from the fluid container 14 via a cleaning fluid draining process, such as via operating the inlet line 122 as an outlet line and/or opening a valve at another exit port. Once the cleaning process or the multiple cleaning processes are complete, the controller 50 may then provide instructions to pump the sample fluid to the fluid container 14 and so forth, as described herein.

It should be appreciated that any features, combinations of features, and variations described with reference to FIGS. 1-5 may be incorporated into FIGS. 6 and 7. For example, the one or more wipers 172 may be utilized together with any of the spray bars described herein.

Figure 9:
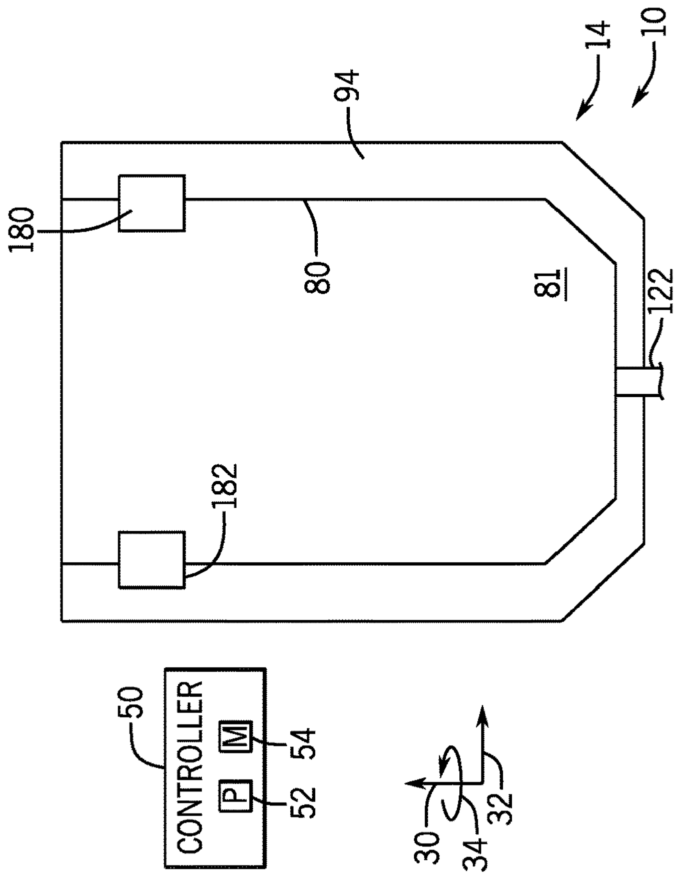
FIG. 9 is a cross-sectional side view of the fluid container of FIG. 8, wherein the bladder within the fluid container is in an inflated configuration, in accordance with an embodiment of the present disclosure.
Figure 8:
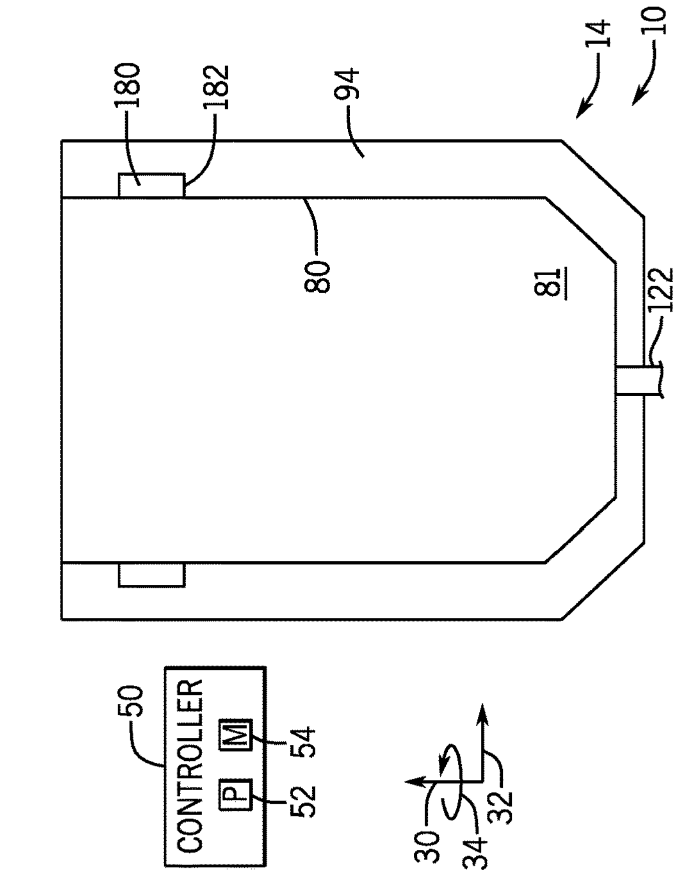
FIG. 8 is a cross-sectional side view of a fluid container that may be utilized as part of the fluid testing system of FIG. 1, wherein a bladder within the fluid container is in a deflated configuration, in accordance with an embodiment of the present disclosure.

FIG. 8 is a cross-sectional side view of an embodiment of the fluid container 14 that may be utilized as part of the fluid testing system 10, wherein a bladder 180 associated with the fluid container 14 is in a deflated configuration (e.g., relaxed or retracted configuration). FIG. 9 is a cross-sectional side view of an embodiment of the fluid container 14, wherein the bladder 180 associated with the fluid container 14 is in an inflated configuration (e.g., expanded or extended configuration). In the deflated configuration, the bladder 180 may be withdrawn into the wall 94 of the fluid container, such as withdrawn into a recess 182 formed along the inner surface 80 of the fluid container 14 (e.g., to be flush with the inner surface 80 of the fluid container 14; define a first inner diameter). In the inflated configuration, the bladder 180 may extend from the wall 94 of the fluid container 14, such as extend from the recess 182 formed along the inner surface 80 of the fluid container 14 (e.g., radially inwardly from the inner surface 80 of the fluid container 14; define a second inner diameter that is less than the first inner diameter).

In order to remove or wash away the residue within the fluid container 14, the controller 50 may instruct the cleaning pump to operate at the cleaning pump rate to pump the cleaning fluid into the fluid container 14, such as via the inlet line 122, any of the spray bars disclosed herein, or any combination thereof. The controller 50 may continue to operate the cleaning pump to pump the cleaning fluid into the fluid container 14, such as until the cleaning fluid reaches the defined level and/or the level limit switch port of FIG. 1. In certain embodiments, the controller 50 may control (e.g., shut off) the cleaning pump to stop flow of the cleaning fluid into the fluid container 14.

A rotor of the rheometer may be driven (e.g., via a rotary actuator) to rotate to facilitate or cause swirl of the cleaning fluid within the chamber 81 of the fluid container 14 as the cleaning fluid fills the chamber 81 of the fluid container 14 and/or with the cleaning fluid at the defined level. The temperature control system may heat (or cool) the fluid container 14 to thereby heat (or cool) contents (e.g., the cleaning fluid and/or the residue) in the fluid container 14 as the cleaning fluid fills the chamber 81 of the fluid container 14 and/or with the cleaning fluid at the defined level. After some period of time, the cleaning fluid may be entirely removed from the fluid container 14 via a cleaning fluid draining process, such as via operating the inlet line 122 as an outlet line and/or opening a valve at another exit port. Once the cleaning process or the multiple cleaning processes are complete, the controller 50 may then provide instructions to pump the sample fluid to the fluid container 14 and so forth, as described herein.

The bladder 180 may be adjusted from the deflated configuration to the inflated configuration at any suitable portion of the cleaning process. For example, the bladder 180 may be adjusted from the deflated configuration to the inflated configuration as the cleaning fluid fills the fluid container 14. In certain embodiments, the bladder 180 may remain in the inflated configuration for an entirety of a duration of a fill portion of the cleaning process (e.g., as the cleaning fluid fills the fluid container 14). In certain embodiments, the bladder 180 may remain in the inflated configuration for an entirety of a duration of the cleaning process (e.g., as the cleaning fluid fills the fluid container 14 and as the cleaning fluid drains from the fluid container 14). In certain embodiments, the bladder 180 may be adjusted to alternate between the deflated configuration and the inflated configuration during the cleaning process (e.g., during any suitable portion(s) of the cleaning process), which may effectively generate pulses or vibrations to loosen the residue from the inner surface 80 of the fluid container 14. For example, the bladder 180 may be adjusted to the deflated configuration for a period of time (e.g., 2, 3, 4, 5, 10, or more seconds), adjusted to the inflated configuration for the period of time or another period of time (e.g., 2, 3, 4, 5, 10, or more seconds), then back to the deflated configuration, and so forth during the cleaning process.

The bladder 180 may be actuated (e.g., inflated) via an activation fluid (e.g., gas or liquid; pneumatic or hydraulic line and associated valves, fluid sources, and so forth) provided to the bladder 180, and the bladder 180 may then return to an unactuated state (e.g., deflated) via withdrawal of the activation fluid from the bladder 180. The activation fluid may be provided and withdrawn via components that are positioned above the fluid container 14, that extend through the wall 94 of the fluid container 14, or any other suitable location.

The bladder 180 may be positioned proximate to the defined level relative to the vertical axis 30, such as above the defined level and at locations of expected residue build up along the inner surface 80 of the fluid container 14. As shown, the bladder 180 may include an annular structure and may extend circumferentially about the chamber 81 of the fluid container 14 (e.g., at least in the deflated configuration) . However, it should be appreciated that the bladder 180 may have any suitable form or shape. For example, the bladder 180 may be an arc structure with a gap, such as to enable placement of the cross-drilled passageway within the wall 94 of the fluid container 14. Further, in such cases, the bladder 180 may be positioned to overlap the defined level relative to the vertical axis 30 (as this is also one of the locations of expected residue build up along the inner surface 80 of the fluid container 14), as the gap may enable placement of the opening to the cross-drilled passageway along the inner surface 80 of the fluid container 14. Additionally, while FIGS. 8 and 9 illustrate one bladder 180, it should be appreciated that multiple bladders may be provided (e.g., stacked along the vertical axis 30 and/or distributed or spaced apart along the circumferential axis 34).

It should be appreciated that any features, combinations of features, and variations described with reference to FIGS. 1-7 may be incorporated into FIGS. 8 and 9. For example, the bladder 180 may be utilized together with any of the spray bars described herein and/or the bladder 180 may be coupled to the rotor 170 of FIGS. 6 and 7 (e.g., to form or operate as the one or more wipers 172; provide an expandable structure that expands radially outwardly from the rotor 170 of FIGS. 6 and 7).

Figure 10:
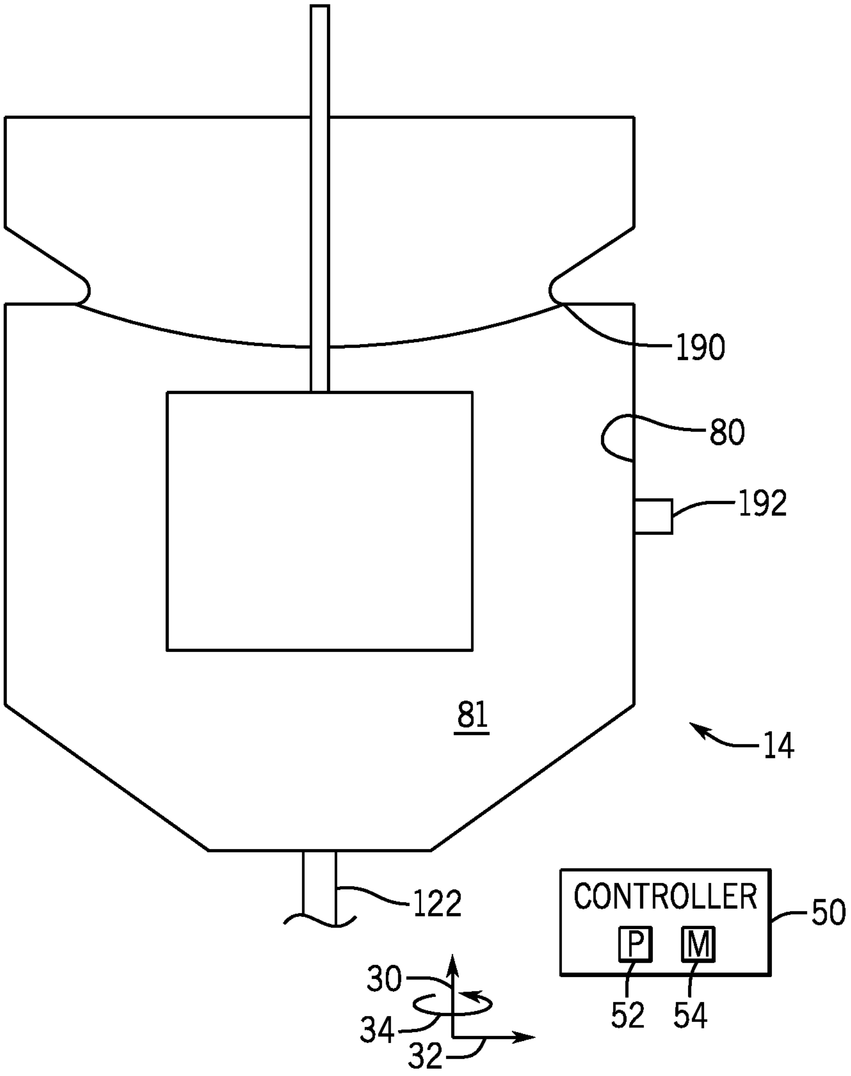
FIG. 10 is a cross-sectional side view of a fluid container that may be utilized as part of the fluid testing system of FIG. 1, wherein the fluid container includes a ledge, in accordance with an embodiment of the present disclosure.

FIG. 10 is a cross-sectional side view of an embodiment of the fluid container 14 that may be utilized as part of the fluid testing system 10, wherein the fluid container 14 includes a ledge 190 along the inner surface 80 of the fluid container 14, in accordance with an embodiment of the present disclosure.

Advantageously, the ledge 190 may block or limit build up of the residue along the inner surface 80 of the fluid container 14, as a defined level may align with the ledge 190 or cause the sample fluid to reach the ledge 190 (e.g., via the centrifugal acceleration; and not above the ledge 190 along the vertical axis 30). Accordingly, to the extent the residue forms along the inner surface 80 of the fluid container 14, the residue would be expected to form along the ledge 190 (e.g., and not above the ledge 190). Further, because the ledge 190 is transverse (e.g., orthogonal) to the vertical axis 30, the residue may be less likely to build up or adhere to the ledge 190 (e.g., as compared to a surface that extends along the vertical axis 30; the residue may fall from the ledge 190 due to gravity).

As shown, the ledge 190 may be an annular ledge that extends circumferentially about the chamber 81 of the fluid container 14. However, it should be appreciated that the ledge 190 may have any suitable form or shape. For example, the ledge 190 may be an arc structure with a gap, such as to extend only partially about the chamber 81 of the fluid container 14 to enable placement of the cross-drilled passageway within the wall of the fluid container 14 in certain configurations.

As described herein, in order to remove or wash away the residue within the fluid container 14, the controller 50 may instruct the cleaning pump to operate at the cleaning pump rate to pump the cleaning fluid into the fluid container 14, such as via the inlet line 122, any of the spray bars disclosed herein, or any combination thereof. The controller 50 may continue to operate the cleaning pump to pump the cleaning fluid into the fluid container 14, such as until the cleaning fluid reaches the defined level and/or the level limit switch port of FIG. 1. In certain embodiments, the controller 50 may control (e.g., shut off) the cleaning pump to stop flow of the cleaning fluid into the fluid container 14.

A rotor of the rheometer may be driven (e.g., via a rotary actuator) to rotate to facilitate or cause swirl of the cleaning fluid within the chamber 81 of the fluid container 14 as the cleaning fluid fills the chamber 81 of the fluid container 14 and/or with the cleaning fluid at the defined level. The temperature control system may heat (or cool) the fluid container 14 to thereby heat (or cool) contents (e.g., the cleaning fluid and/or the residue) in the fluid container 14 as the cleaning fluid fills the chamber 81 of the fluid container 14 and/or with the cleaning fluid at the defined level. After some period of time, the cleaning fluid may be entirely removed from the fluid container 14 via a cleaning fluid draining process, such as via operating the inlet line 122 as an outlet line and/or opening a valve at another exit port. Once the cleaning process or the multiple cleaning processes are complete, the controller 50 may then provide instructions to pump the sample fluid to the fluid container 14 and so forth, as described herein.

It should be appreciated that any features, combinations of features, and variations described with reference to FIGS. 1-9 may be incorporated into FIG. 10. For example, the ledge 190 and/or other geometric features may be utilized together with any of the spray bars described herein, the one or more wipers 172 of FIGS. 6 and 7, and/or the bladder 180 of FIGS. 8 and 9.

It is also envisioned that various other features may be incorporated into the fluid testing system 10 to facilitate the cleaning process. To facilitate discussion, certain examples are provided in FIG. 10; however, it should be appreciated that such components may be incorporated into and/or used in combination with any features described with reference to FIGS. 1-9. For example, one or more vibration devices 192 (e.g., acoustic emitters; mechanical knocking device) may be coupled to the wall of the fluid container 14 and may be operated (e.g., to apply acoustic waves to the wall of the fluid container 14) during the cleaning process. The one or more vibration devices 192 may apply continuous vibrations or pulses of vibrations during the cleaning process.

Embodiments of a cleaning system described herein may facilitate use of a fluid testing system that provides a positive level, as the cleaning system may facilitate removal of residue that may accumulate in a fluid container due to the positive level (e.g., with sample fluid during testing processes) and that may also be difficult to remove due to the positive level (e.g., as cleaning fluid is also removed by the positive level).

For example, to obtain accurate measurements with a viscometer, the sample fluid within the fluid container should be at the defined level. The fluid testing system provides the positive level via placement of an opening in the fluid container at the defined level. In such cases, the fluid testing system facilitates extraction of the sample fluid through the opening in the fluid container via operation of a suction pump (e.g., level pump). The opening may connect to a cross-drilled passageway that extends through the fluid container. Advantageously, these features enable the defined level to be achieved without use of any sensors to monitor a level of the sample fluid in the fluid container. However, these features also cause the cleaning fluid to remain at the defined level and may make it difficult to remove the residue that is expected to accumulate at or above the defined level (e.g., due to centrifugal acceleration). Accordingly, the cleaning system and features that may be implemented in the cleaning system as described herein may enable application of a cleaning fluid to the residue, provide agitation of the cleaning fluid and/or the residue, and so forth to clean the fluid container. However, as noted herein, the cleaning system may also be utilized with any of a variety of types or configurations of the fluid testing system (e.g., without the positive level).

While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the disclosure as defined by the following appended claims. Any features shown in FIGS. 1-10 or described with reference to FIGS. 1-10 may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A fluid testing system, comprising:
- a fluid container with an inner surface that defines a chamber;
- an inlet line fluidly coupled to the fluid container;
- an outlet line fluidly coupled to the fluid container;
- a fill pump configured to pump a sample fluid from a sample fluid source through the inlet line into the chamber of the fluid container;
- a suction pump configured to extract the sample fluid out of the chamber of the fluid container through the outlet line;
- a spray bar that extends circumferentially about at least a portion of the chamber, wherein the spray bar comprises a plurality of cleaning fluid outlets configured to spray a cleaning fluid onto the inner surface that defines the chamber; and a cleaning pump configured to pump the cleaning fluid from a cleaning fluid source into the chamber of the fluid container through the plurality of cleaning fluid outlets of the spray bar.

2. The fluid testing system of claim 1, wherein the spray bar is an annular structure or an arc structure.

3. The fluid testing system of claim 1, wherein the spray bar is coupled to the inner surface that defines the chamber via one or more fasteners, one or more brackets, or any combination thereof.

4. The fluid testing system of claim 1, further comprising a drive assembly that is configured to move the spray bar within the chamber.

5. The fluid testing system of claim 1, wherein the spray bar comprises an internal channel configured to distribute the cleaning fluid to the plurality of cleaning fluid outlets.

6. The fluid testing system of claim 1, further comprising a rotor of a rheometer, wherein the rotor is positioned in the chamber and comprises one or more wipers that are configured to adjust between a retracted configuration and an extended configuration.

7. The fluid testing system of claim 1, further comprising a bladder that extends circumferentially about a respective portion of the chamber, wherein the bladder is configured to adjust between a deflated configuration and an inflated configuration.

8. The fluid testing system of claim 1, wherein the inner surface that defines the chamber comprises a ledge that is proximate to a defined level for the sample fluid.

9. The fluid testing system of claim 1, wherein the outlet line is formed within a wall of the fluid container, wherein the outlet line includes an opening in the wall of the fluid container, the opening positioned such that the suction pump extracting fluid through the outlet line maintains a defined level for the sample fluid in the chamber of the fluid container, wherein the spray bar is positioned above the defined level relative to a vertical axis.

10. The fluid testing system of claim 1, wherein the cleaning fluid comprises a gas, a liquid, or any combination thereof.

11. The fluid testing system of claim 1, further comprising a vibration device configured to apply vibrations to the fluid container.

12. The fluid testing system of claim 1, further comprising a controller configured to control operation of the cleaning pump, the fill pump, and the suction pump.

13. The fluid testing system of claim 1, further comprising a rheometer coupled to the fluid container, wherein the rheometer is configured to detect rheology parameters of a sample of drilling fluid within the chamber of the fluid container.

14. A fluid testing system, comprising:

a fluid container;

a passageway formed in a wall of the fluid container to maintain a defined level for a sample fluid in a chamber of the fluid container;

an inlet line fluidly coupled to the fluid container;

a fill pump configured to pump the sample fluid from a sample fluid source through the inlet line into the chamber of the fluid container;

a suction pump configured to extract the sample fluid out of the chamber of the fluid container through the passageway;

a spray bar comprising a plurality of cleaning fluid outlets configured to spray a cleaning fluid into the chamber of the fluid container; and a cleaning pump configured to pump the cleaning fluid from a cleaning fluid source into the chamber of the fluid container through the spray bar.

15. The fluid testing system of claim 14, wherein the spray bar is an annular structure or an arc structure.

16. The fluid testing system of claim 14, wherein the spray bar is positioned above the defined level relative to a vertical axis.

17. The fluid testing system of claim 14, wherein the spray bar comprises an internal channel configured to distribute the cleaning fluid to the plurality of cleaning fluid outlets.

18. The fluid testing system of claim 14, wherein the plurality of cleaning fluid outlets are oriented along a radial axis, offset from the radial axis, or any combination thereof.

19. A fluid testing system, comprising:

a fluid container;

a rheometer configured to detect rheology parameters of a sample of drilling fluid within a chamber of the fluid container during a testing process;

a passageway formed in a wall of the fluid container to maintain a defined level for the sample of drilling fluid in the chamber of the fluid container;

an inlet line fluidly coupled to the fluid container;

a fill pump configured to pump the sample of drilling fluid from a drilling fluid source through the inlet line into the chamber of the fluid container;

a suction pump configured to extract the sample of drilling fluid out of the chamber of the fluid container through the passageway;

a spray bar comprising a plurality of cleaning fluid outlets configured to spray a cleaning fluid into the chamber of the fluid container during a cleaning process; and a cleaning pump configured to pump the cleaning fluid from a cleaning fluid source into the chamber of the fluid container through the spray bar.

20. The fluid testing system of claim 14, further comprising:

a rheometer coupled to the fluid container, the rheometer configured to detect rheology parameters of the sample fluid within the chamber of the fluid container; and a controller configured to control operation of the cleaning pump, the fill pump, the suction pump, and the rheometer, the controller configured to operate the fill pump and the suction pump to provide a new aliquot of the sample fluid within the chamber of the fluid container, the controller configured to stop operation of the fill pump and begin operation of the rheometer to detect rheology parameters of the new aliquot of the sample fluid within the chamber of the fluid container.

* * * * *